(12) United States Patent
Tamiya (10) Patent No.: US 9,110,874 B2
(45) Date of Patent: Aug. 18, 2015

(54) DOCUMENT CONVERSION APPARATUS AND DOCUMENT CONVERSION METHOD

(75) Inventor: Keisuke Tamiya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1517 days.

(21) Appl. No.: 12/199,546

(22) Filed: Aug. 27, 2008

(65) Prior Publication Data

US 2009/0063957 A1    Mar. 5, 2009

(30) Foreign Application Priority Data

Sep. 3, 2007    (JP) .................................. 2007-228283

(51) Int. Cl.
*G06F 17/00* (2006.01)
*G06F 17/22* (2006.01)

(52) U.S. Cl.
CPC .......... *G06F 17/2247* (2013.01); *G06F 17/227* (2013.01); *G06F 17/2264* (2013.01)

(58) Field of Classification Search
CPC .......................... G06F 17/2247; G06F 17/2264
USPC ....................................................... 715/239
See application file for complete search history.

(56) References Cited

U.S. PATENT DOCUMENTS

| | | | |
|---|---|---|---|
| 6,209,124 B1 * | 3/2001 | Vermeire et al. .............. | 717/114 |
| 6,772,413 B2 * | 8/2004 | Kuznetsov ..................... | 717/136 |
| 7,647,415 B1 * | 1/2010 | Sandoz et al. ................. | 709/230 |
| 7,774,746 B2 * | 8/2010 | Mansfield et al. ............ | 717/106 |
| 7,783,968 B2 * | 8/2010 | Sahota et al. .................. | 715/238 |
| 2003/0149934 A1 * | 8/2003 | Worden ......................... | 715/513 |
| 2007/0150806 A1 * | 6/2007 | Hartmann ...................... | 715/523 |

FOREIGN PATENT DOCUMENTS

| | | |
|---|---|---|
| JP | 2003-518291 A | 6/2003 |
| JP | 2004-258773 A | 9/2004 |

OTHER PUBLICATIONS

Timmerer, et al., "Efficient Processing of MPEG-21 Metadata in the Binary Domain" Klagenfurt University ITEC Technical Report No. TR/ITEC/05/1.10 published Aug. 2005, p. 1-13.*
Stylus Studio ("Stylus"), "Binary XML", retrieved from Internet Archive Wayback Machine capture dated Oct. 27, 2006, http://web.archive.org/web/20061027223944/http://www.stylusstudio.com/binary_xml.html, p. 1-3.*
Imamura, et al., "Mapping between ASN.1 and XML", copyright 2001 IEEE, p. 57-64.*
ITU-T Recommendation X.891, "Information technology—Generic applications of ASN.1: Fast infoset", May 2005, p. 1-102.*

(Continued)

*Primary Examiner* — Amelia Tapp
(74) *Attorney, Agent, or Firm* — Carter, DeLuca, Farrell & Schmidt, LLP (57) ABSTRACT

A template element, among template elements constituting a template, which corresponds to a document element constituting an original document is set as a corresponding template element and a content of format conversion processing for the document element is determined on the basis of the corresponding template element. Format conversion processing based on the determined content is performed. A result of format conversion processing is output as a result of conversion of the format of the original document.

19 Claims, 10 Drawing Sheets

(56) References Cited

OTHER PUBLICATIONS

Tidwell, "The XML Security Suite: Increasing the security of e-business" Apr. 2000, retrieved from http://www-4.ibm.com/software/developer/library/xmlsecuritysuite/index.html, p. 1-8.*

Travis, et al., "LabVIEW for everyone : graphical programming made easy and fun", copyright 2007, Pearson Education, Inc., Chapter 14, "Fitting Square Pegs into Round Holes: Advanced Conversions and Typecasting" p. 1-5.*

Holman, "What is XSLT" published Aug. 16, 2000, XML.com, available at http://www.xml.com/pub/a/2000/08/holman/index.html, p. 1-40.*

Japanese Office Action for Application No. 2007-228283 dated May 25, 2012.

* cited by examiner

```
<xsl:stylesheet version="1.0" xmlns:xsl="http://www.w3.org/1999/XSL/Transform"
  xmlns:bx="http://example.org/binaryxml">                    ~201
  <xsl:output method="xml" bx:format="fast_infoset"/>
  <xsl:template match="/">                                     202
    <xsl:element name="root">
      <xsl:element name="outputs">
        <xsl:element name="output1" bx:type="short">  ~203
          <xsl:value-of select="/root/inputs/input1"/>
        </xsl:element>
        <xsl:element name="output2" bx:type="int">  ~204
          <xsl:value-of select="/root/inputs/input2"/>
        </xsl:element>
        <xsl:element name="output3">
          <xsl:attribute name="value" bx:type="float">  ~205
            <xsl:value-of select="/root/inputs/input3"/>
          </xsl:attribute>
        </xsl:element>
      </xsl:element>
    </xsl:element>
  </xsl:template>
</xsl:stylesheet>
```

FIG. 3

```
<root>
  <inputs>
    <input1>12345</input1>
    <input2>123456789</input2>
    <input3>-118.625</input3>
  </inputs>
</root>
```

| CONVERSION ALGORITHM IDENTIFIER | DATA TYPE | CONVERSION PROCESSING NAME |
|---|---|---|
| 1 | short | CONVERSION PROCESSING 1 |
| 2 | int | CONVERSION PROCESSING 2 |
| 3 | float | CONVERSION PROCESSING 3 |
| ... | ... | ... |

FIG. 7A

```
<root>
  <outputs>
    <output1>12345</output1>
    <output2>123456789</output2>
    <output3 value="-118.625"/>
  </outputs>
</root>
```

```
<grammer xmlns="http://relaxng.org/ns/structure/1.0"
datatypeLibraly="http://www.w3.org/2001/XMLSchema-datatypes">
  <start>
    <element name="root">
      <element name="outputs">                                  1101
        <element name="output1"><data type="short"/></element>
        <element name="output2"><data type="int"/></element>
        <element name="output3">                      1102
          <attribute name="value"><data type="float"/></attribute>
        </element>                                    1103
      </element>
    </element>
  </start>
</grammer>
```

FIG. 12

```
<xsl:stylesheet version="1.0" xmlns:xsl="http://www.w3.org/1999/XSL/Transform">
  <xsl:output method="xml"/>
  <xsl:template match="/">
    <xsl:element name="root">
      <xsl:element name="outputs">
        <xsl:element name="output1">
          <xsl:value-of select="/root/inputs/input1"/>
        </xsl:element>
        <xsl:element name="output2">
          <xsl:value-of select="/root/inputs/input2"/>
        </xsl:element>
        <xsl:element name="output3">
          <xsl:attribute name="value">
            <xsl:value-of select="/root/inputs/input3"/>
          </xsl:attribute>
        </xsl:element>
      </xsl:element>
    </xsl:element>
  </xsl:template>
</xsl:stylesheet>
```

FIG. 13

| NODE NAME | DATA TYPE |
|---|---|
| /root/outputs/output1 | short |
| /root/outputs/output2 | int |
| /root/outputs/output3/@value | float |

DOCUMENT CONVERSION APPARATUS AND DOCUMENT CONVERSION METHOD

BACKGROUND OF THE INVENTION

1. Field of the Invention

The present invention relates to techniques for converting structured documents.

2. Description of the Related Art

XML (Extensible Markup Language) has been formulated by W3C (World Wide Web Consortium), a standards organization, as a language for describing documents. XML permits description of documents structured by components (nodes) such as elements and attributes.

A document described in XML is in a text format. However, there are techniques for expressing the same document in a binary format. Fast Infoset standardized by ITU-T (International Telecommunication Union-Telecommunication Standardization Sector) (ITU-T X.891) is a representative example of such techniques. Fast Infoset allows a document described in XML to be expressed with a decreased data size, using information on data type of nodes.

On the other hand, there are techniques, such as XSLT (Extensible Stylesheet Language Transformations) 1.0 formulated by W3C and VTL (Velocity Template Language) developed by The Apache Software Foundation, for converting a document into a structured document in another format using a template describing a conversion scheme.

To convert a structured document into another format, a user creates a template with XSLT 1.0 and specifies the template and the structured document to be converted in a program called a template engine that performs conversion processing.

In addition, Japanese Patent Laid-Open No. 2004-258773 discloses a technique for compressing an XML document using a template.

In general, it is possible to convert a structured document described in XML or the like into a structured document in another format described in XML, XHTML, or the like, using a template described in a template description language such as XSLT 1.0.

However, when a structured document is to be converted into a document in a binary XML format such as Fast Infoset that allows data representation other than character strings (e.g., floating point representation of IEEE754), it conventionally has not been possible to convert the document using a template.

In such a case, it is necessary to convert the document into a text XML document, which allows conversion using a template, and then convert the document into a binary XML document using an encoder for binary XML. Thus, conversion processes, such as analysis and output of the structured document, have to be performed multiple times. In addition, sufficient conversion speed may not be realized when a device with a low processing speed is used.

SUMMARY OF THE INVENTION

The present invention has been made in view of the above circumstances. Accordingly, there is a need for a technique for facilitating conversion of a format of structured document data into another format.

According to an aspect of the present invention, a document conversion apparatus for converting a format of structured document data using template data describing contents of a format conversion processing includes a determining unit configured to determine a content of the format conversion processing for a document element constituting the structured document data, such determination being based on a corresponding template element, wherein the corresponding template element is a template element, among template elements constituting the template data, which corresponds to the document element. The document conversion apparatus also includes a processing unit and an output unit. The processing unit is configured to perform the format conversion processing on the document element based on the conversion processing content determined by the determining unit, and the output unit is configured to output a result of the format conversion processing performed by the processing unit.

Further features of the present invention will become apparent from the following description of exemplary embodiments with reference to the attached drawings.

DESCRIPTION OF THE EMBODIMENTS

In the following, exemplary embodiments of the present invention will be described in detail with reference to the attached drawings. It should be understood that the following embodiments are merely examples of configurations of the

First Exemplary Embodiment

Figure 1:
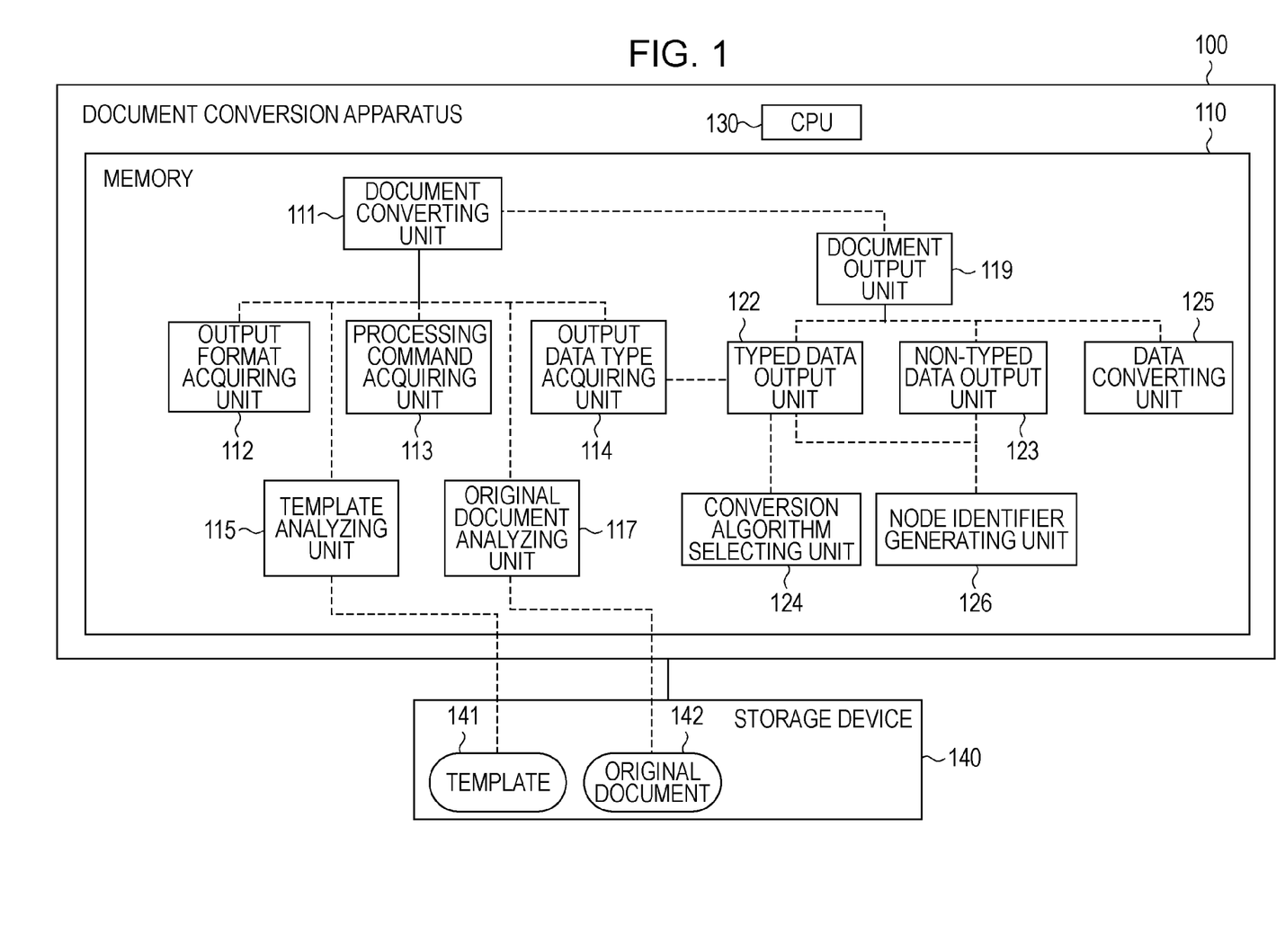
FIG. 1 is a block diagram illustrating an example of a hardware configuration of a document conversion apparatus according to a first exemplary embodiment of the present invention.

FIG. 1 is a block diagram illustrating an example of a hardware configuration of a document conversion apparatus according to a first exemplary embodiment of the present invention. Note that FIG. 1 shows only components primarily used in the following description and does not include all components of the document conversion apparatus. The following description is not limited to the configuration illustrated in FIG. 1.

As illustrated in FIG. 1, the document conversion apparatus according to the present exemplary embodiment is composed of a document conversion apparatus main body 100 (hereinafter simply referred to as a document conversion apparatus 100) and a storage device 140.

Now, the storage device 140 will be described.

The storage device 140 is a large capacity information storage device such as a hard disk drive device. This storage device 140 stores an OS (operating system), data of a template 141 (template data), and data of an original document 142 to be converted.

Data of the template 141 (hereinafter simply referred to as a template 141) describes details of processing of conversion of the format of the original document 142 (conversion processing contents).

The original document 142 is structured document data subject to conversion processing described below.

In the following, the document conversion apparatus 100 will be described.

The document conversion apparatus 100 is composed of a CPU (central processing unit) 130 and a memory 110.

The CPU 100 controls the entire document conversion apparatus 100 using programs stored in the memory 110 and data loaded from the storage device 140 into the memory 110. In addition, the CPU 130 executes processing which is described below as being performed by the document conversion apparatus 100.

The memory 110 is composed of a RAM (random access memory), a ROM (read-only memory), and the like. The memory 110 stores a document converting unit 111, an output format acquiring unit 112, a processing command acquiring unit 113, an output data type acquiring unit 114, a template analyzing unit 115, an original document analyzing unit 117, a document output unit 119, and a typed data output unit 122. In addition, the memory 110 stores a non-typed data output unit 123, a conversion algorithm selecting unit 124, a data converting unit 125, and a node identifier generating unit 126. These components are implemented using computer programs and these programs can send and receive data to and from each other. In the following description, these components may be described as subjects that perform operations. However, in reality, the CPU 130 executes the computer programs corresponding to these components so that processing corresponding to these components is performed.

In addition, the memory 110 has a data area for temporarily storing data loaded from the storage device 140 in accordance with control performed by the CPU 130.

Figure 2:
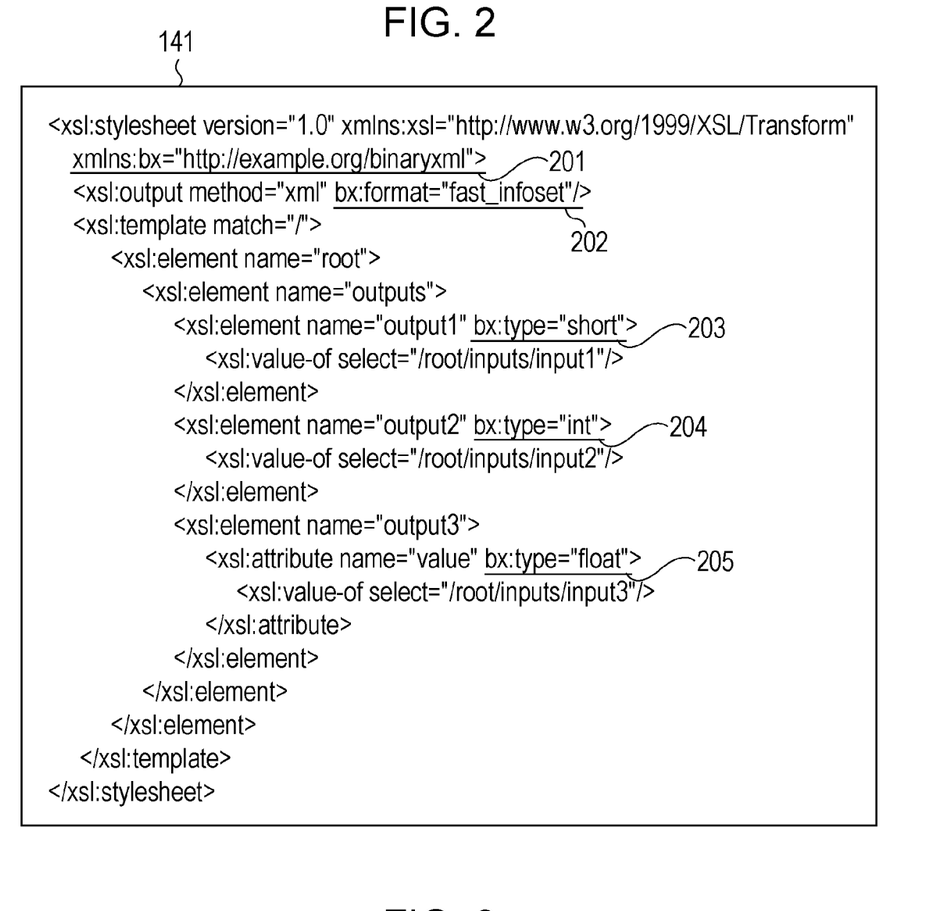
FIG. 2 illustrates an example of a configuration of a template described in XSLT 1.0, which is formulated by W3C.

FIG. 2 illustrates an example of a configuration of the template 141 described in XSLT 1.0, which is formulated by W3C. In the present exemplary embodiment, as shown in FIG. 2, the template 141 includes the following information in addition to general descriptions specified by the XSLT specification. Specifically, in the template 141, a namespace definition 201 for defining a command for binary XML output, a format of binary XML to be output (binary XML output format 202), data types 203, 204, and 205 of elements and an attribute which are data units constituting an XML document.

Figure 3:
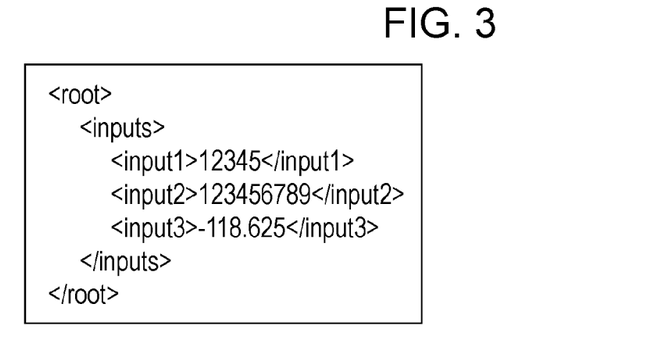
FIG. 3 illustrates an example of a configuration of an original document described in an XML 1.0, which is a markup language formulated by W3C.

FIG. 3 illustrates an example of a configuration of the original document 142 described in XML 1.0, which is a markup language formulated by W3C.

In the following description, the template 141 having the configuration illustrated in FIG. 2 and the original document 142 having the configuration illustrated in FIG. 3 are used. However, the following description is not limited to such a case, and various modifications may be easily made by a person skilled in the art as necessary even if the configurations are changed.

Figure 8:
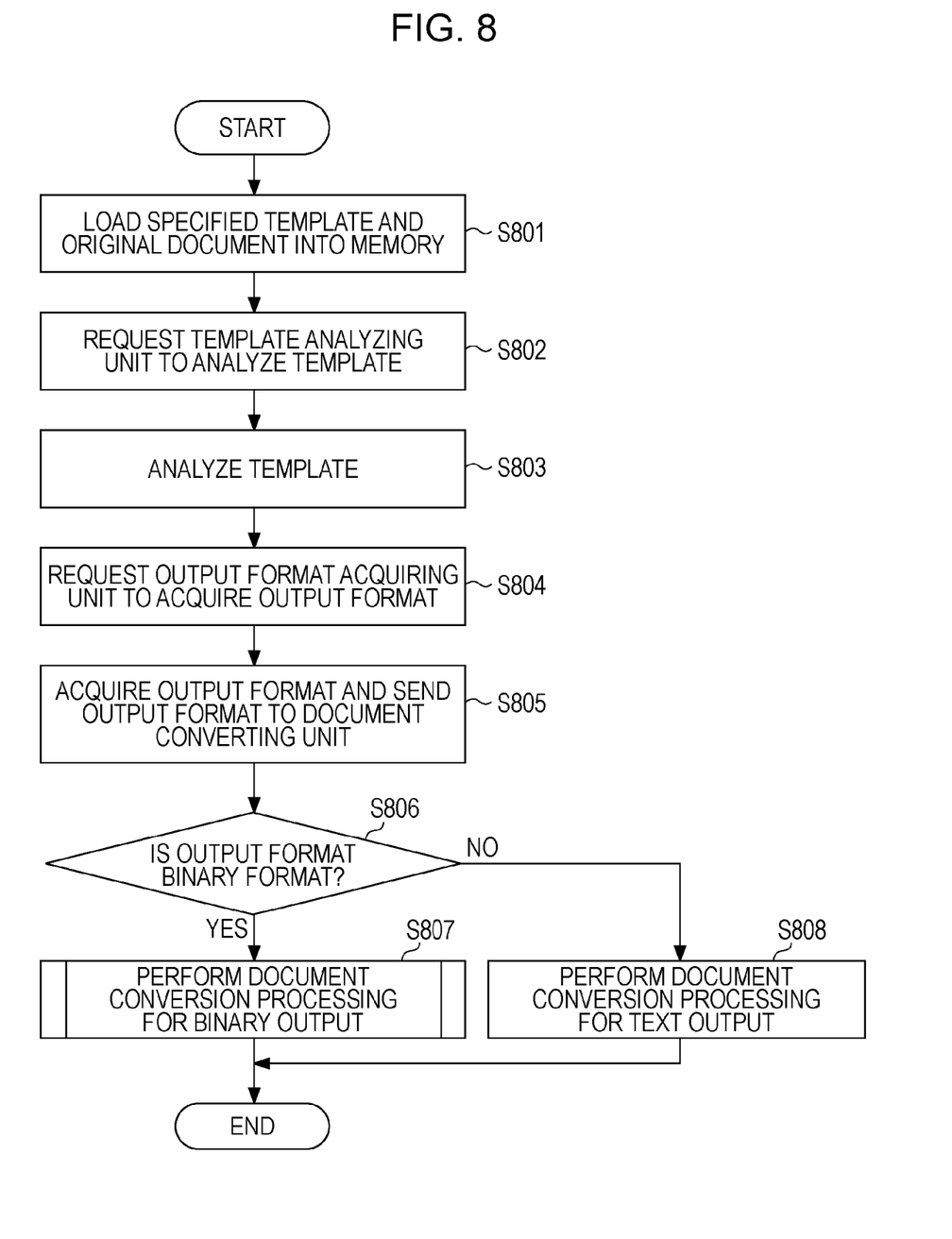
FIG. 8 is a flowchart illustrating a processing procedure for converting a format of an original document, which is performed by a CPU executing a computer program stored in a memory.

FIG. 8 is a flowchart illustrating a procedure of processing for converting the format of the original document 142. This processing is performed by the CPU 130 executing the computer programs stored in the memory 110.

First, an instruction specifying structured document data to be converted and an instruction specifying a template to be used for converting the structured document data are input to the document conversion apparatus 100 from an operation unit (not shown) of the document conversion apparatus 100 or an application (not shown) stored in the memory 110.

At Step S801, upon receiving the instructions, the document converting unit 111 loads the specified template and document data from the storage device 140 into the memory 110. In the present exemplary embodiment, the loaded template is the template 141 illustrated in FIG. 2, and the loaded structured document data is the original document 142 illustrated in FIG. 3.

At Step S802, the document converting unit 111 requests the template analyzing unit 115 to analyze the template 141 which has been loaded into the memory 110 in Step S801.

At Step S803, upon receiving the request, the template analyzing unit 115 analyzes the template 141 and expands an analysis result in the memory 110.

Figure 4:
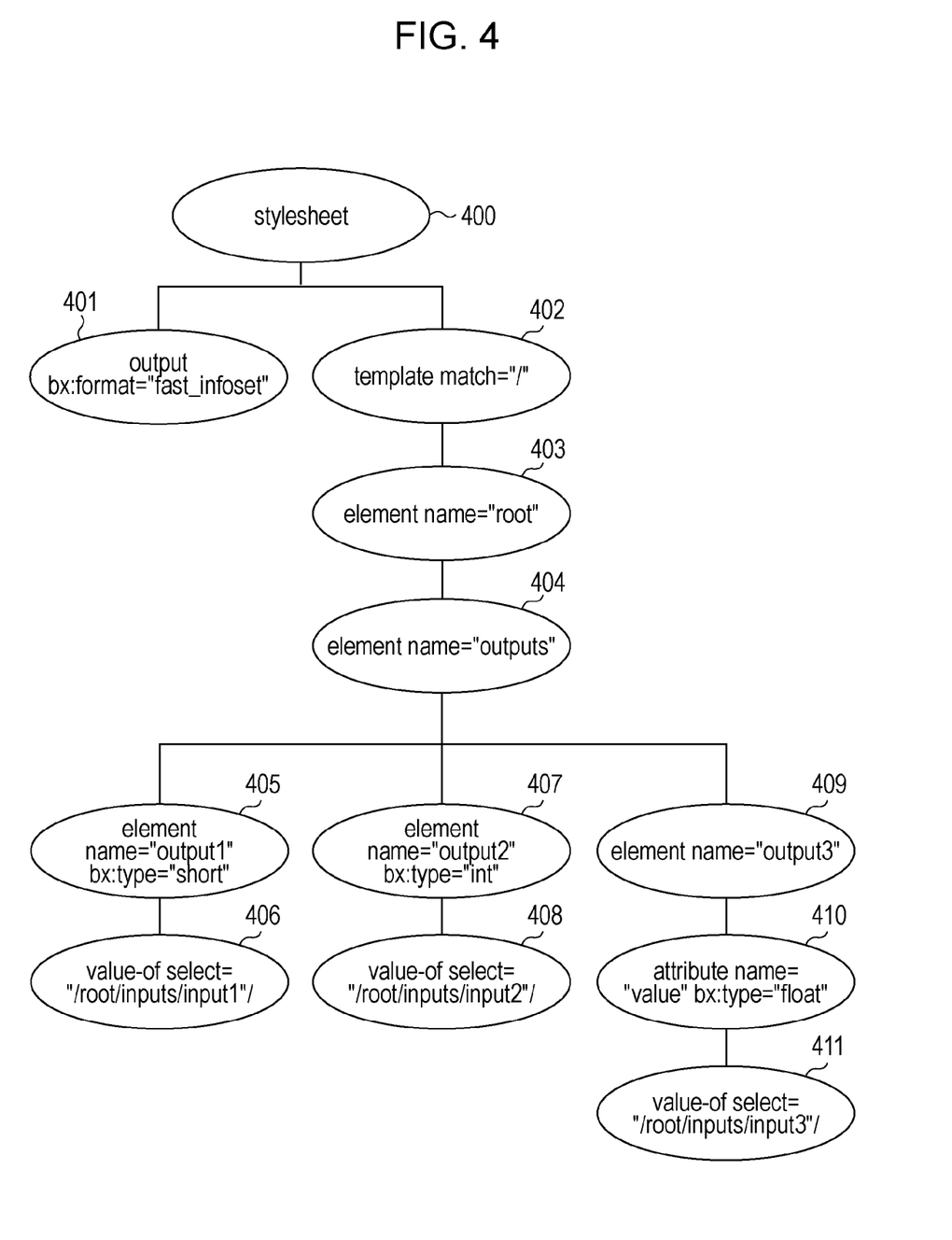
FIG. 4 illustrates an example of a tree structure which is expanded in a memory and corresponds to a result of analysis of a template.

FIG. 4 illustrates an example of a tree structure which is obtained by expanding the result of analysis of the template 141 performed by the template analyzing unit 115 in the memory 110. In this tree structure, units of processing commands described in the template 141 (template elements) are expanded as tree nodes (401 to 411). Note that the analysis result of the template 141 to be expanded in the memory 110 does not necessarily have the structure shown in FIG. 4, and may have any other structure as long as the structure of the template 141 is maintained.

Referring back to FIG. 8, at Step S804, the document converting unit 111 requests the output format acquiring unit 112 to acquire a format in which the original document 142 is to be converted and output (output format).

At Step S805, the output format acquiring unit 112 searches the tree corresponding to the analysis result of the template 141 for an output node 401 which defines an output format. The output format acquiring unit 112 notifies the document converting unit 111 of the output format. In the present exemplary embodiment, Fast Infoset (ITU-T X.891), which is a format for binary XML formulated by ITU-T, is specified as the output format in the form of a character string "bx:format="fast_infoset"".

Then, at Step 806, the document converting unit 111 determines whether the output format notified by the output format acquiring unit 112 in Step S805 is binary XML or text XML. If it is determined that the output format is binary XML, the procedure proceeds to Step S807. Processing of Step S807 will be described below using FIG. 9 and FIG. 10. On the other hand, if it is determined that the output format is text XML, the procedure proceeds to Step S808.

At Step S808, the document converting unit 111 performs processing for converting the original document (structured document data) 142 into a text XML format for output (document conversion processing for text output). This processing is performed in accordance with the XSLT 1.0 specification defined by W3C as performed by a general XSLT processor, and thus a more detailed description of the processing is omitted.

Figure 9:
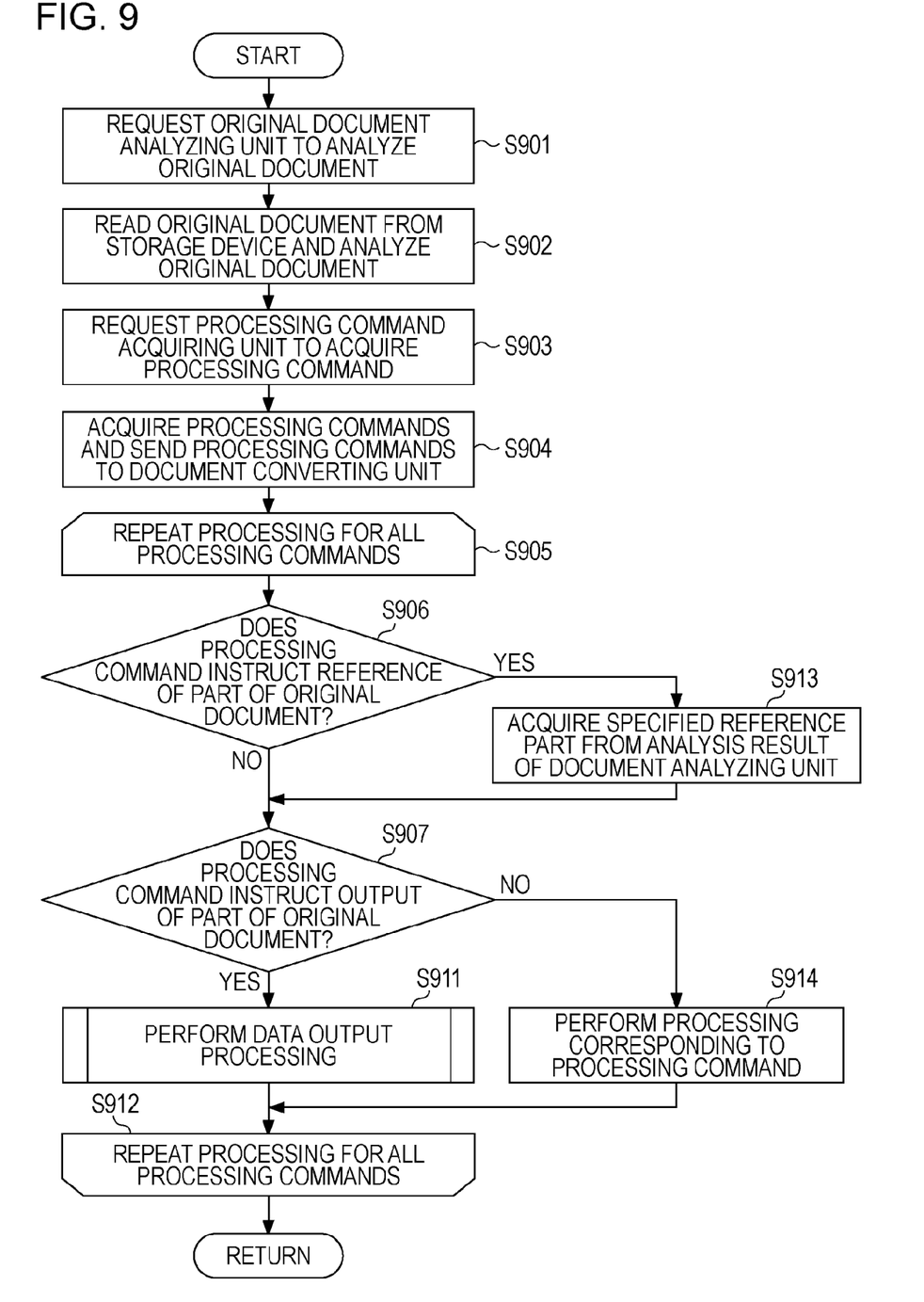
FIG. 9 is a flowchart illustrating in detail a procedure of processing of Step S807.

FIG. 9 is a flowchart illustrating in detail a procedure of the processing of Step S807 mentioned above.

At Step S901, the document converting unit 111 requests the original document analyzing unit 117 to analyze the original document 142.

At Step S902, the original document analyzing unit 117 having received the request analyzes the original document 142 which has been loaded into the memory 110 in Step S801.

Figure 5:
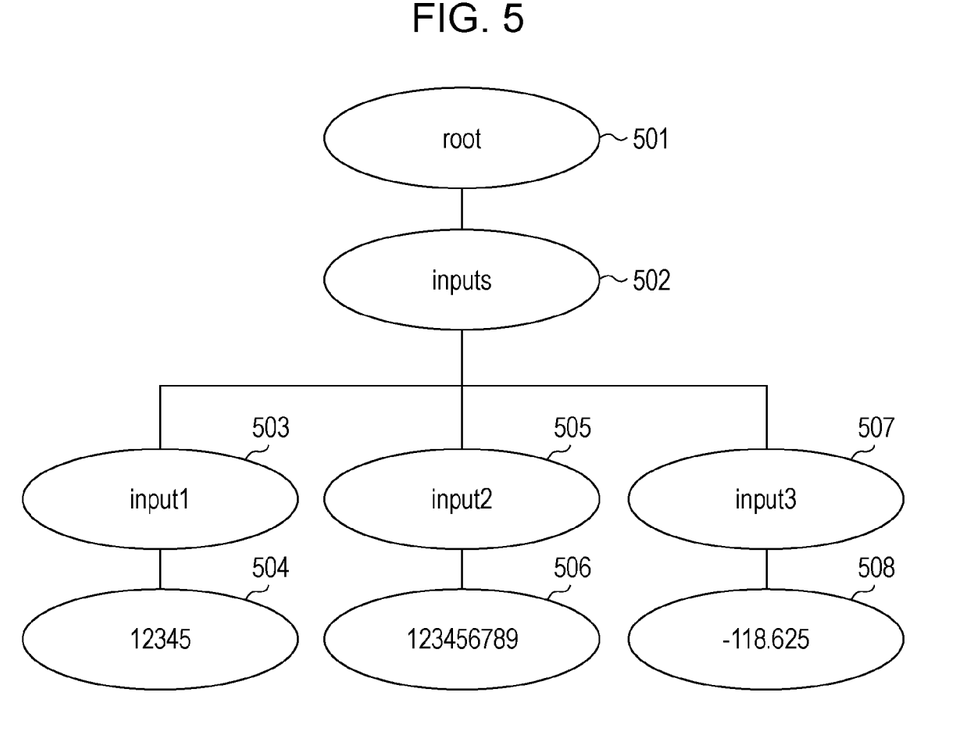
FIG. 5 illustrates an example a tree structure which is expanded in a memory and corresponds to a result of analysis of an original document.

FIG. 5 illustrates an example of a tree structure obtained by expanding the result of analysis of the original document 142 performed by the original document analyzing unit 117 in the memory 110. In this tree structure, units of individual components of the original document 142 (document elements) are expanded as tree nodes (501 to 508). Note that the analysis result of the original document 142 to be expanded in the memory 110 does not necessarily have the structure described in FIG. 5, and it may have any other structure as long as the structure of the original document 142 is maintained.

Referring back to FIG. 9, at Step S903, the document converting unit 111 requests the processing command acquiring unit 113 to acquire processing commands from the tree corresponding to the analysis result of the template 141 which has been obtained in the processing of Step S803.

At Step S904, the processing command acquiring unit 113 having received the request sequentially acquires processing commands from the tree and sends the acquired processing commands to the document converting unit 111. Specifically, the processing command acquiring unit 113 sequentially sends the document converting unit 111 the output node (command) 401, a template node (command) 402, an element node (command) 403, . . . , and a value-of node (command) 411.

Then, a processing loop from Step S905 to Step S912 is performed for each of the processing commands acquired by the processing command acquiring unit 113.

At Step S906, if the processing command received from the processing command acquiring unit 113 is a processing command for referring to a part of the original document 142, such as a value-of command, the procedure proceeds to Step S913. At Step S913, the document converting unit 111 acquires a data portion to be referred to (reference portion) specified in the processing command received from the processing command acquiring unit 113. For example, the reference portions specified in the value-of commands 406, 408, and 411 are "/root/inputs/input1", "/root/inputs/input2", and "/root/inputs/input3", respectively. Thus, when the document converting unit 111 receives the value-of commands 406, 408, and 411 from the processing command acquiring unit 113, the document converting unit 111 acquires "12345", "123456789", and "−118.625", respectively, from the analysis result shown in FIG. 5.

On the other hand, if it is determined in Step S906 that the processing command received from the processing command acquiring unit 113 is not a command for referring to a part of the original document 142, the procedure proceeds to Step S907.

At Step S907, it is determined that the processing command received from the processing command acquiring unit 113 is a command for outputting a part of the original document 142 (corresponding template element). If it is determined that the processing command is not a corresponding template element, the procedure proceeds to Step S914. A corresponding template element may be a processing command such as a stylesheet command 400, the output command 401, or the template command 402.

At Step S914, the document converting unit 111 performs processing corresponding to the processing command received from the processing command acquiring unit 113.

On the other hand, if it is determined in Step S907 that the processing command received from the processing command acquiring unit 113 is a command for outputting a part of the original document 142, such as the stylesheet command 400, the output command 401, or the template command 402 (corresponding template element), the procedure proceeds to Step S911.

Figure 10:
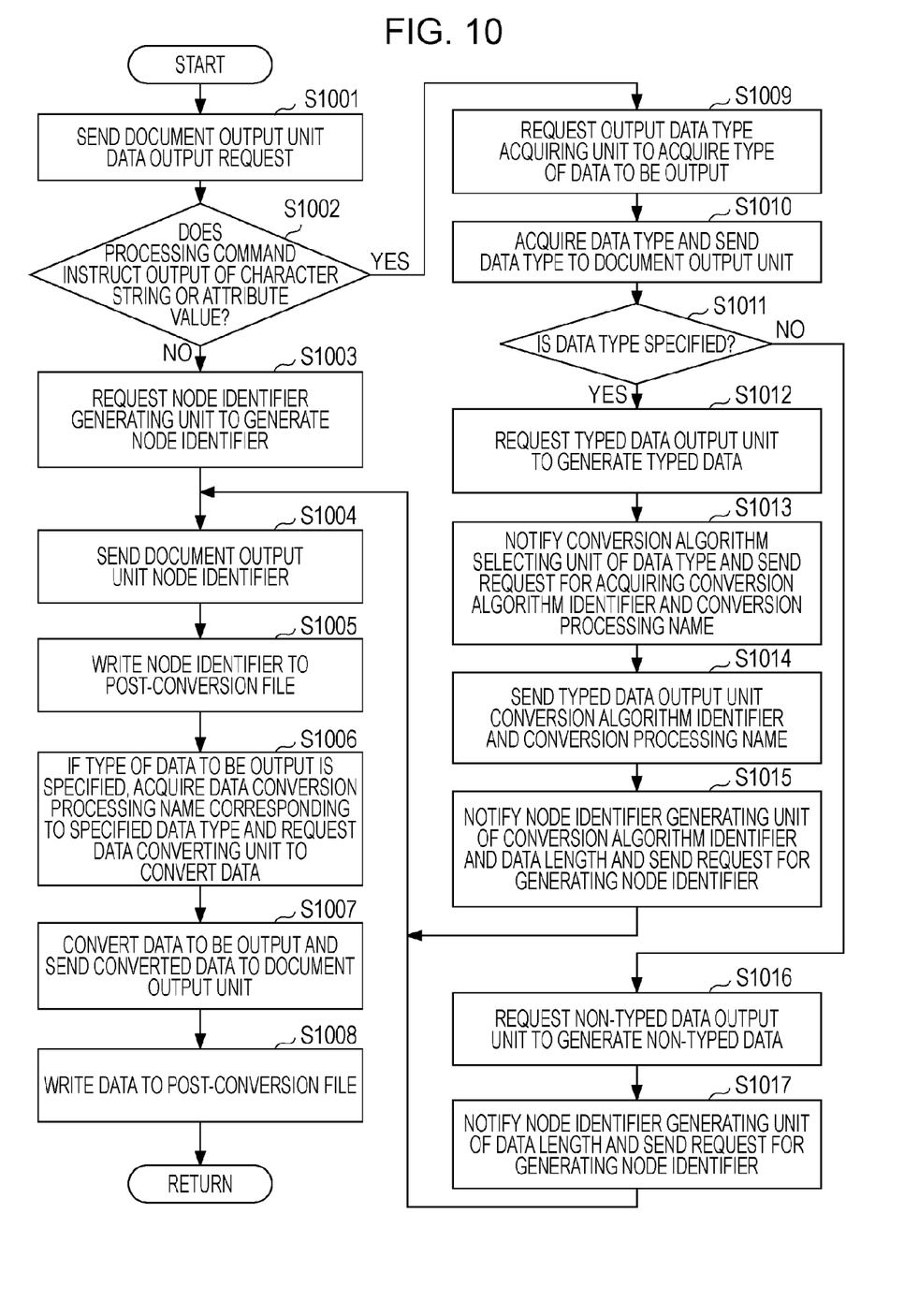
FIG. 10 is a flowchart illustrating in detail a procedure of processing of Step S911.

FIG. 10 is a flowchart illustrating in detail a procedure of the processing of Step S911.

At Step S1001, the document converting unit 111 sends a data output request to the document output unit 119.

At Step S1002, the document output unit 119 determines whether the processing command acquired by the processing command acquiring unit 113 is a command for outputting a character string or an attribute value in an element in the original document 142. If the processing command is determined to be a command for outputting a character string or an attribute value in an element in the original document 142, the procedure proceeds to Step S1009. On the other hand, if the processing command is determined to not be a command for outputting a character string or an attribute value, the procedure proceeds to Step S1003.

For example, if the processing command acquired by the processing command acquiring unit 113 is the value-of command 406, 408, or 411, the corresponding character string (406 or 408) or the corresponding attribute value (411) is to be acquired, respectively, in Step S913 described above. Thus, in this case, the procedure proceeds to Step S1009.

At Step S1009, the document output unit 119 requests the output data type acquiring unit 114 to acquire a type of data to be output.

At Step S1010, upon receiving the request, the output data type acquiring unit 114 acquires (from the tree corresponding to the analysis result of the template 141) a type of data to be output.

For example, when the data type of the character string to be output in accordance with the value-of command 406 is requested, the output data type acquiring unit 114 acquires a data type "short", which is defined as "bx:type="short"" in the element command 405. Similarly, when the data type of the character string to be output in accordance with the value-of command 408 is requested, the output data type acquiring unit 114 acquires a data type "int", which is defined as "bx:type="int"" in the element command 407. In addition, when the data type of the character string to be output in accordance with the value-of command 411, the output data type acquiring unit 114 acquires a data type "float", which is defined as "bx:type="float"" in the attribute command 410.

Then, the output data type acquiring unit 114 sends the data type acquired in this way to the document output unit 119.

At Step S1011, if the data type has been successfully acquired, i.e., if the type of data to be output is specified, the procedure proceeds to Step S1012. On the other hand, if the type of data to be output is not specified, the procedure proceeds to Step S1016.

At Step S1012, the document output unit 119 notifies the typed data output unit 122 of the data type received from the output data type acquiring unit 114 and requests the typed data output unit 122 to generate data of which the type is specified.

At Step 1013, upon receiving the request, the typed data output unit 122 notifies the conversion algorithm selecting unit 124 of the data type received from the document output unit 119 and requests the conversion algorithm selecting unit 124 to acquire a conversion algorithm identifier and a conversion processing name.

At Step S1014, upon receiving the request, the conversion algorithm selecting unit 124 refers to data in a conversion algorithm table contained therein and acquires a conversion algorithm identifier and a conversion processing name corresponding to the data type notified from the typed data output unit 122. Then, the conversion algorithm selecting unit 124 sends the acquired conversion algorithm identifier and conversion processing name to the typed data output unit 122.

Figure 6:
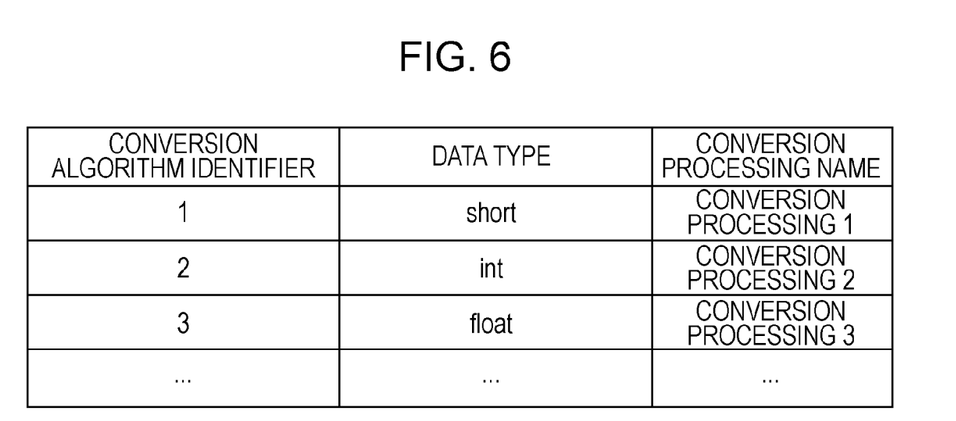
FIG. 6 illustrates an example of a configuration of a conversion algorithm table in a conversion algorithm selecting unit.

FIG. 6 is an example of a configuration of the conversion algorithm table of the conversion algorithm selecting unit 124.

As illustrated in FIG. 6, in the conversion algorithm table, data types and conversion processing names corresponding to conversion algorithm identifiers are stored as entries. The conversion algorithm identifiers are identifiers for uniquely identifying an algorithm to be used to convert a character string into a binary representation. The conversion names are used for denoting data conversion that can be executed by the data converting unit 125. For example, when the data converting unit 125 can execute a plurality of types of data conversion, the conversion processing names can be the names of functions used in the data conversion or pointers to the functions.

Therefore, when the conversion algorithm table shown in FIG. 6 is used, the conversion algorithm selecting unit 124 having received the data type "short" from the typed data output unit 122 returns the corresponding conversion algorithm identifier "1" and conversion name "conversion processing 1" to the typed data output unit 122.

Referring back to FIG. 10, at Step S1015, the typed data output unit 122 notifies the node identifier generating unit 126 of the received conversion algorithm identifier and a predetermined data length and requests the node identifier generating unit 126 to generate a node identifier. Then, the procedure proceeds to Step S1004.

On the other hand, at Step S1016, the document output unit 119 requests the non-typed data output unit 123 to generate data of which the type is not specified.

At Step S1017, the non-typed data output unit 123 notifies the node identifier generating unit 126 of a predetermined data length and requests the node identifier generating unit 126 to generate a node identifier representing a character string. Then, the procedure proceeds to Step S1004.

On the other hand, if it is determined in Step S1002 that the processing command acquired by the processing command acquiring unit 113 is a command for outputting data other than a character string or an attribute value in an element in the original document 142, the procedure proceeds to Step S1003. For example, if the processing command is a command for generating an element (xsl:element) or an attribute (xsl:attribute), the procedure proceeds to Step S1003.

At Step S1003, the document output unit 119 requests the node identifier generating unit 126 to generate a node identifier on the basis of the type of data to be output.

At Step S1004, the node identifier generating unit 126 generates a node identifier requested in each processing of Step S1003, Step S1015, and Step S1017, and sends the generated node identifier to the document output unit 119.

That is, in Step S1003, Step S1015, and Step S1017, various information for generating node identifiers is collected.

A node identifier is an identifier for identifying a node representing the entire XML document or a node constituting part of the document, such as an element node, an attribute node, or a string node, within binary data. In the Fast Infoset specification described above, a node identifier is determined by the node type, identifier of a conversion algorithm used in conversion into a binary representation, node name, data length after conversion, and the presence or absence of a child node.

At Step S1005, the document output unit 119 writes the node identifier received from the node identifier generating unit 126 to a file for storing data to be output (post-conversion file) which is saved in the memory 110.

At Step S1006, if the type of data to be output is specified, i.e., if the typed data output unit 122 has received a conversion algorithm identifier and a conversion processing name from the conversion algorithm selecting unit 124, the document output unit 119 acquires the conversion processing name. For example, when the data type "short" is specified, the document output unit 119 acquires "conversion processing 1" as the conversion processing name.

Then, the document output unit 119 notifies the data converting unit 125 of the conversion processing name to cause the data converting unit 125 to perform conversion processing corresponding to the conversion processing name. In this way, binary conversion corresponding to the acquired conversion processing name can be performed on the character string to be output.

At Step S1007, the data converting unit 125 performs binary conversion corresponding to the conversion processing name notified from the document output unit 119 on the character string to be output. Then, the data converting unit 125 sends a result of the binary conversion to the document output unit 119. Note that if the type of data to be output is not specified, the processing of Step S1006 and Step S1007 is omitted. That is, no binary conversion is performed on the character string to be output.

Subsequently, at Step S1008, the document output unit 119 writes the data of the character string to be output which has not been converted or the data obtained as a result of the binary conversion to the post-conversion file. If the written data is at the end of an element content, an attribute, or a document, a terminator (F(16)) is written in accordance with the Fast Infoset specification.

As a result of the above procedure, the result of conversion of the format of the original document 142 is stored in the post-conversion file.

In the following, using the analysis result of the template 141 expanded as illustrated in FIG. 4, the detailed sequence in which data in the Fast Infoset format is written to the post-conversion file as a result of the procedures performed in accordance with the flowcharts in FIG. 8 to FIG. 10 will be described.

Figure 7A:
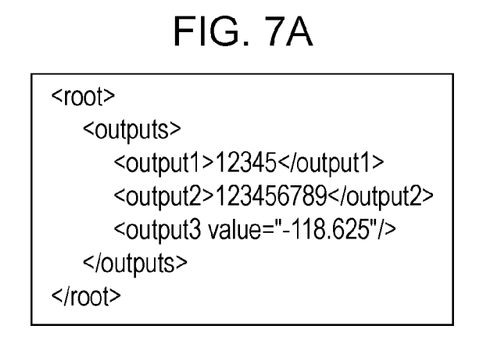
FIG. 7A illustrates an example of a text representation of the content of a post-conversion file shown in FIG. 7B.
Figure 7B:
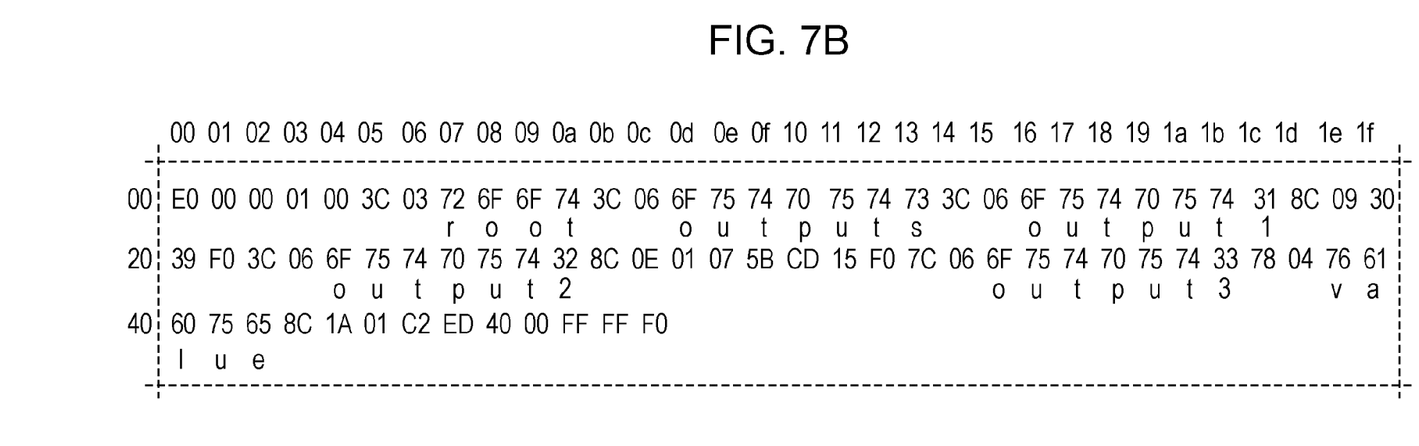
FIG. 7B illustrates the content of a post conversion file in the Fast Infoset format which is written in accordance with a sequence according to the first exemplary embodiment.

1. Identifier of entire document
E0 00 00 01 00 (16)
2. Identifier of "root" element
3C 03 72 6F 6F 74 (16) (no attribute, element name: "root")
3. Identifier of "outputs" element
6F 75 74 70 75 74 73 (16) (no attribute, element name: "output")
4. Identifier of "output1" element
3C 06 6F 75 74 70 75 74 31 (16) (no attribute, element name: "output1")
5. Identifier of content of "output1" element 8C 09 (16) (binarized using "short" algorithm, two-byte length)
6. Binary representation of content of "output1" element
30 39 (16) ("short" representation of "12345")
7. Terminator of "output1" element
F0 (16)
8. Identifier of "output2" element
3C 06 6F 75 74 70 75 74 32 (16) (no attribute, element name: "output2")
9. Identifier of content of "output2" element
8C 0E 01 (16) (binarized using "int" algorithm, four-byte length)
10. Binary representation of content of "output2" element
07 5B CD 15 (16) ("int" representation of "123456789")
11. Terminator of "output2" element
F0 (16)
12. Identifier of "output3" element
7C 06 6F 75 74 70 75 74 33 (16) (with attribute, element name: "output3")
13. Identifier of "value" attribute
78 04 76 61 6C 75 65 (16) (attribute name: "value")
14. Identifier of attribute value of "value" attribute
8C 1A 01 (16) (binarized using "float" algorithm, four-byte length)
15. Binary representation of attribute value of "value" attribute
C2 ED 40 00 (16) ("float" representation of "−118.625")
16. Terminators of "value" attribute, "output3" element, "output" element, and "root" element
FF FF (16)
17. Terminator of entire document
F0 (16)

FIG. 7B illustrates the content of the post-conversion file in the Fast Infoset format which has been written in accordance with the above sequence. FIG. 7A illustrates a text representation of the content of the post-conversion file illustrated in FIG. 7B.

As described above, according to the present exemplary embodiment, a structured document may be converted into a document in a binary XML format, which provides a high compression ratio, without generating a document in an intermediate format from the original document. Thus, according to the present exemplary embodiment, conversion performance can be enhanced.

Second Exemplary Embodiment

In the first exemplary embodiment described above, the output data type acquiring unit 114 acquires the data type of a node such as an element node or an attribute node from an analysis result of a template in Step S1010 of the data output processing. In this case, the output data type acquiring unit 114 searches for the definition of a data type indicated as "bx:type" in the template.

In XML documents, data types of nodes can be defined using so-called schema languages.

In the present exemplary embodiment, a document conversion apparatus 100 is provided with a schema analyzing unit in addition to the other components of the document conversion apparatus 100 described in the first exemplary embodiment. The schema analyzing unit acquires a data type of a node on the basis of a schema definition described in an XML schema language which defines the structure of an original document. When the output data type acquiring unit 114 invokes the schema analyzing unit, the schema analyzing unit analyzes a schema and returns the data type of a node to the output data type acquiring unit 114. This arrangement permits conversion of document without describing the data type in a template.

Configurations and operations of the present exemplary embodiment other than described above are the same as those of the first exemplary embodiment.

Figure 11:
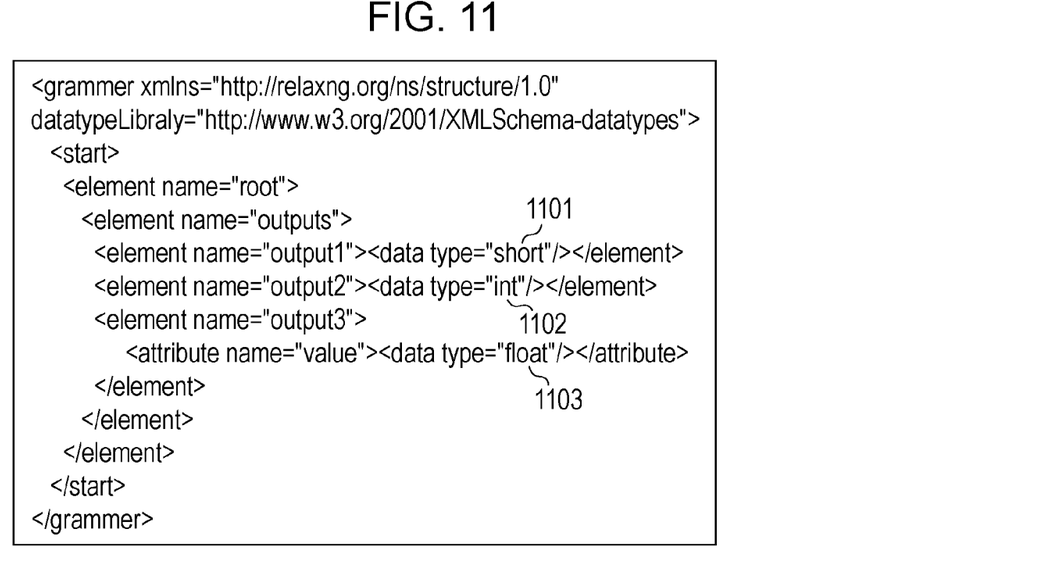
FIG. 11 illustrates an example of a schema of a converted document in the Relax NG language, which is a schema language formulate by ISO.

FIG. 11 illustrates a schema of a converted document described in the Relax NG language, which is a schema language formulated by ISO. Descriptions 1101 to 1103 indicate that the data types of an "output1" element, and an "output2" element are "short" and "int", respectively, and the value attribute of an "output3" element is "float".

By referring to these descriptions, the output data type acquiring unit 114 can search for the data types of individual nodes.

Figure 12:
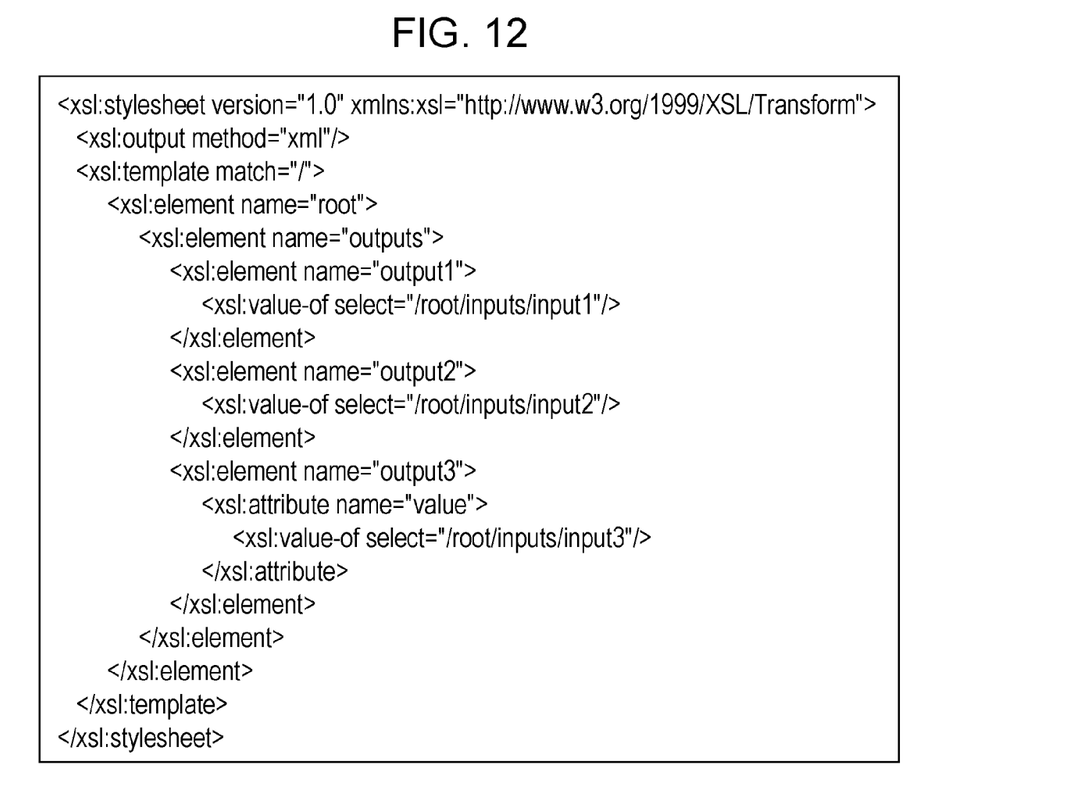
FIG. 12 illustrates an example of a configuration of a template used in a second exemplary embodiment of the present invention.

FIG. 12 illustrates a configuration of a template used in the present exemplary embodiment. Unlike the first exemplary embodiment, it is not necessary to define data types in the template.

Third Exemplary Embodiment

In the first exemplary embodiment, the output data type acquiring unit 114 acquires the data type of a node such as an element node or an attribute node from an analysis result of a template in Step S1010 of the data output processing. In this case, the output data type acquiring unit 114 searches for the definition of a data type indicated as "bx:type" in the template.

In the present exemplary embodiment, a document conversion apparatus 100 is provided with a data type table searching unit in addition to the components of the document conversion apparatus 100 of the first exemplary embodiment. In this case, the definitions of data types are not provided in a template but are stored in a preset data type table, so that the data type table searching unit acquires a data type from the data type table.

In such a case, when the output data type acquiring unit 114 invokes the data type table searching unit, the data type table searching unit searches the data type table for the data type of a node and returns the resultant data type to the output data type acquiring unit 114. This permits conversion of a document without describing data types in a template.

Configurations and operations of the present exemplary embodiment other than described above are the same as those of the first exemplary embodiment.

Figure 13:
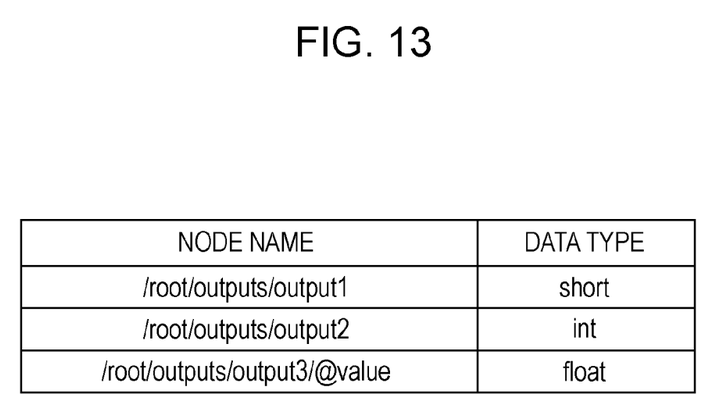
FIG. 13 illustrates an example of a configuration of a data type table of a converted document used in a third exemplary embodiment of the present invention.

FIG. 13 illustrates an example of a configuration of a data type table of a converted document which is used in the present exemplary embodiment. This data type table contains names of nodes and data types. In this example, the node names are described using the Xpath language formulated by W3C.

Other Exemplary Embodiments

It should be understood that the present invention is also achieved by supplying a storage medium (or a recording medium) storing software program code for realizing the functions of the above-described embodiments to a system or apparatus. Such a storage medium is a computer-readable storage medium. The program code stored in the storage medium is read out and executed by a computer (CPU or MPU) of the system or apparatus. In this case, the program code read out from the storage medium realizes the functions of the embodiments, and thus the storage medium storing the program code is encompassed by the present invention.

The functions of the above-described embodiments may be realized when the computer executes the readout program code. Further, the functions of the above-described embodiments may be realized when an OS or the like running on the computer performs some or all of actual processes on the basis of the instructions of the program.

Further, the functions of the above-described embodiments may also be realized when the program code read out from the storage medium is written to the memory of a function expansion board inserted into the computer or the memory of a function expansion unit connected to the computer, and then the CPU of the function expansion board or function expansion unit performs part or all of actual processes on the basis of the instructions of the program.

When the present invention is applied to the storage medium, program code corresponding to the flowcharts described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-228283 filed on Sep. 3, 2007, which is hereby incorporated by reference herein in its entirety.

What is claimed is:

1. A document conversion apparatus for converting a format of a structured document using a template, the document conversion apparatus comprising:
   a computer processor; and
   a memory that stores at least one computer program executed by the computer processor, the at least one computer program comprising program code that, when executed by the computer processor, implements:
      a first determining unit configured to determine whether a binary format is specified as an output format of the structured document in the template;
      a command acquiring unit configured to acquire a processing command for the structured document from the template used for converting the format of the structured document in a case where the first determining unit determines that the binary format is specified as the output format of the structured document;
      a second determining unit configured to, in a case where the processing command acquired by the command acquiring unit is a command for outputting a part of the structured document, determine whether an output format of the part of the structured document is specified in the template; and
      a writing unit configured to, in a case where the output format of the part of the structured document is specified in the template, perform binary conversion associated beforehand with the output format on the part of the structured document and write a result of the binary conversion in a file for storing output data, and in a case where the output format of the part of the structured document is not specified in the template, write the part of the structured document in the file.

2. The document conversion apparatus according to claim 1, wherein the at least one computer program further comprises program code that, when executed by the computer processor, implements:
   a processing unit configured to receive a structured document including a first document element and a second document element, the processing unit configured to process a template;
   a converting unit configured to perform a first binary conversion algorithm on the first document element and to perform a second binary conversion algorithm on the second document element, wherein the second binary conversion algorithm is different from the first binary conversion algorithm; and
   an output unit configured to output the structured document in the binary format.

3. The document conversion apparatus of claim 2, wherein the template includes a processing command for outputting at least one of the document elements as a part of the structured document.

4. The document conversion apparatus of claim 2, wherein the at least one computer program further comprises program code that, when executed by the computer processor, implements an acquiring unit that acquires a first data type corresponding to the first document element and a second data type corresponding to the second document element, the first data type different from the second data type.

5. The document conversion apparatus of claim 4, wherein the acquiring unit acquires, from a schema definition defining a structure of the structured document, the first data type corresponding to the first document element and the second data type corresponding to the second document element.

6. The document conversion apparatus of claim 5, wherein the schema definition is described in an XML schema language.

7. The document conversion apparatus of claim 4, wherein information for generating a node identifier based on the template is collected by the acquiring unit.

8. The document conversion apparatus of claim 7, wherein the processing unit generates the node identifier when processing the template to convert the structured document to the binary format.

9. The document conversion apparatus of claim 4, wherein the acquiring unit acquires, from the template, the first data type corresponding to the first document element and the second data type corresponding to the second document element.

10. The document conversion apparatus of claim 4, wherein the acquiring unit acquires, from a preset data type table, the first data type corresponding to the first document element and the second data type corresponding to the second document element.

11. The document conversion apparatus of claim 4, wherein the acquiring unit is configured to determine the first binary conversion algorithm to be performed on the first document element based on the first data type.

12. The document conversion apparatus of claim 4, wherein the acquiring unit is configured to determine the second binary conversion algorithm to be performed on the second document element based on the second data type.

13. The document conversion apparatus of claim 2, wherein the converting unit is configured to perform a plurality of binary conversion algorithms, including a character string to int binary conversion algorithm, a char string to float binary conversion algorithm, and a char string to short binary conversion algorithm.

14. The document conversion apparatus of claim 1, wherein the first determining unit is configured to determine whether the binary format is specified as the output format of the structured document by referring to the output format of the structured document described in the template.

15. The document conversion apparatus of claim 1, wherein the first determining unit is configured to determine whether the binary format is specified as the output format of the structured document by referring to the output format of the structured document described in a schema definition defining a structure of a structured document whose output format has been converted.

16. The document conversion apparatus of claim 1, wherein the writing unit is configured to hold information of a list in which a plurality of types of output formats and binary conversion names for expressing data of the output formats in a binary format are registered, specify a binary conversion name corresponding to the output format of the part of the structured document specified in the template by referring to the information of the list, perform binary conversion having the specified binary conversion name on the part of the structured document, and write a result of the binary conversion in the file.

17. The document conversion apparatus of claim 1, wherein the second determining unit is configured to, in a case where the processing command acquired by the command acquiring unit is a command for outputting a character string in the structured document, determine whether an output format of the character string is specified in the template,
wherein the writing unit is configured to, in a case where the output format of the character string is specified in the template, perform binary conversion associated beforehand with the output format on the character string and write a result of the binary conversion in the file, and
wherein the writing unit is configured to, in a case where the output format of the character string is not specified in the template, write the character string in the file.

18. A method for converting a format of a structured document using a template, the method comprising:
determining whether a binary format is specified as an output format of the structured document in the template;
acquiring a processing command for the structured document from the template used for converting the format of the structured document in a case where it is determined that the binary format is specified as the output format of the structured document;
determining, in a case where the acquired processing command is a command for outputting a part of the structured document, whether an output format of the part of the structured document is specified in the template;
performing, in a case where the output format of the part of the structured document is specified in the template, binary conversion associated beforehand with the output format on the part of the structured document and write a result of the binary conversion in a file for storing output data; and
writing, in a case where the output format of the part of the structured document is not specified in the template, the part of the structured document in the file.

19. A non-transitory computer readable storage medium storing a plurality of computer-executable instructions that, when executed by a computer processor, perform a method for converting a format of a structured document using a template, the method comprising:
determining whether a binary format is specified as an output format of the structured document in the template;
acquiring a processing command for the structured document from the template used for converting the format of the structured document in a case where it is determined that the binary format is specified as the output format of the structured document;
determining, in a case where the acquired processing command is a command for outputting a part of the structured document, whether an output format of the part of the structured document is specified in the template;
performing, in a case where the output format of the part of the structured document is specified in the template, binary conversion associated beforehand with the output format on the part of the structured document and write a result of the binary conversion in a file for storing output data; and
writing, in a case where the output format of the part of the structured document is not specified in the template, the part of the structured document in the file.

* * * * *